United States Patent
Murayama

(10) Patent No.: US 7,830,403 B2
(45) Date of Patent: Nov. 9, 2010

(54) IMAGE-FORMING DEVICE

(75) Inventor: Kentaro Murayama, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 449 days.

(21) Appl. No.: 12/031,838

(22) Filed: Feb. 15, 2008

(65) Prior Publication Data

US 2008/0218771 A1 Sep. 11, 2008

(30) Foreign Application Priority Data

Mar. 9, 2007 (JP) ............................. 2007-060315

(51) Int. Cl.
*G03G 15/01* (2006.01)
(52) U.S. Cl. ..................................... 347/116
(58) Field of Classification Search ................. 347/115, 347/116; 399/301
See application file for complete search history.

(56) References Cited

U.S. PATENT DOCUMENTS

| | | | |
|---|---|---|---|
| 6,008,826 A | 12/1999 | Foote et al. | |
| 6,101,359 A | 8/2000 | Tamura | |
| 2006/0139433 A1 | 6/2006 | Yoshida | |
| 2008/0225307 A1* | 9/2008 | Murayama et al. | ........... 358/1.4 |

FOREIGN PATENT DOCUMENTS

| | | |
|---|---|---|
| JP | 10-115962 | 5/1998 |
| JP | 11-143172 | 5/1999 |
| JP | 11-160952 | 6/1999 |
| JP | 11-327249 | 11/1999 |
| JP | 2003-156905 | 5/2006 |
| JP | 2006-215524 | 8/2006 |

* cited by examiner

*Primary Examiner*—Huan H Tran
(74) *Attorney, Agent, or Firm*—Banner & Witcoff, Ltd

(57) ABSTRACT

An image-forming device includes a conveying unit and a pattern data generating unit. The conveying unit conveys a target in a conveying direction, the target having a target light reflectance. The pattern data generating unit generates pattern data indicating a pattern in which a plurality of marks is arranged in the conveying direction. The plurality of marks includes a first mark having a first color and a first light reflectance and a plurality of second marks having a plurality of second colors and a plurality of second light reflectance. The plurality of second colors is equal to or different from one another. The plurality of second light reflectance is equal to or different from one another. A first difference between the target light reflectance and the first light reflectance is greater than a second difference between the target light reflectance and any of the plurality of second light reflectance. At least one of first distances between the first mark and the marks adjacent to the first mark is greater than a minimum distance between the adjacent second marks.

11 Claims, 9 Drawing Sheets

IMAGE-FORMING DEVICE

CROSS REFERENCE TO RELATED APPLICATION

This application claims priority from Japanese Patent Application No. 2007-060315 filed Mar. 9, 2007. The entire content of each of these priority applications is incorporated herein by reference.

TECHNICAL FIELD

The present invention relates to an image-forming device.

BACKGROUND

Tandem image-forming devices are well known in the art. This type of image-forming device is typically provided with a photosensitive member for each of the colors yellow, magenta, cyan, and black, for example. The photosensitive members are juxtaposed along the circulating direction of a paper-conveying belt. Color images carried on the photosensitive members are thus transferred onto paper conveyed on the belt.

However, if the positions at which the color images are formed on the paper deviate from each other in this tandem image-forming device, the resulting color image is not registered properly. Hence, aligning the formation positions of the color images is vital.

To this end, Japanese unexamined patent application publication No. HEI-11-327249 discloses an image-forming device for detecting offset in the formation positions of the color images and for calibrating these positions. More specifically, this image-forming device forms a registration pattern configured of yellow, magenta, cyan, and black patterns on the conveying belt, each color pattern including a plurality of marks arranged along the conveying direction of the belt. The positions of marks constituting the color patterns formed on the belt vary according to positional offset of the corresponding colored images.

Therefore, the image-forming device sets one of the colors yellow, magenta, cyan, or black as a reference color, measures distances between marks in the pattern of the reference color and the patterns of the other colors based on detection signals outputted from photosensors detecting the positions of the marks, and determines whether these distances match predetermined values. If the distances do not match, then the image-forming device determines that the color images are out of registration and performs calibration to correct this registration error.

The photosensor described above includes a light-emitting element for irradiating light onto a portion of the belt positioned within a prescribed detection region, and a light-receiving element for receiving light reflected from the detection region, for example. The amount of light received by the light-receiving element changes as each of the colored marks on the moving belt passes sequentially through the detection region. Therefore, it is possible to detect positions of each colored mark based on the timing at which the amount of light received by the light-receiving element changes.

SUMMARY

Here, the reflection characteristics of each mark differ according to the color of the mark and, consequently, the waveform of the light received by the light-receiving element also differs. By not giving any consideration to this data, Patent Reference 1 described above cannot always detect the position of each mark with accuracy because changes in the amount of reflected light for a certain colored mark interferes with changes in the amount of reflected light for other adjacent marks.

One method of overcoming this problem is to lengthen the distance between each colored mark, but this increases the overall length of the registration pattern and, hence, increases the time required for detecting the positions of the colored marks.

In view of the foregoing, it is an object of the present invention to provide an image-forming device capable of detecting data related to the position of each colored mark with accuracy, without lengthening the overall pattern.

In order to attain the above and other objects, the present invention provides an image-forming device including a conveying unit, a pattern data generating unit, an image-forming unit, and a detecting unit. The conveying unit conveys a target in a conveying direction, the target having a target light reflectance. The pattern data generating unit generates pattern data indicating a pattern in which a plurality of marks is arranged in the conveying direction. The plurality of marks includes a first mark having a first color and a first light reflectance and a plurality of second marks having a plurality of second colors and a plurality of second light reflectance. The plurality of second colors is equal to or different from one another. The plurality of second light reflectance is equal to or different from one another. A first difference between the target light reflectance and the first light reflectance is greater than a second difference between the target light reflectance and any of the plurality of second light reflectance. A difference between the first light reflectance and any of the second light reflectance is larger than a difference between any two of the second light reflectance. At least one of first distances between the first mark and the marks adjacent to the first mark is greater than a minimum distance between the adjacent second marks. The image-forming unit forms the plurality of marks in the conveying direction at positions on the target based on the pattern data. The detecting unit detects the positions at which the plurality of marks is formed on the target, based on changes of light reflected from the target and the plurality of marks in the conveying direction.

BRIEF DESCRIPTION OF THE DRAWINGS

The particular features and advantages of the invention as well as other objects will become apparent from the following description taken in connection with the accompanying drawings, in which.

DETAILED DESCRIPTION

A preferred embodiment of the present invention will be described with reference to FIGS. 1 through 9.

<Overall Structure of the Printer>

Figure 1:
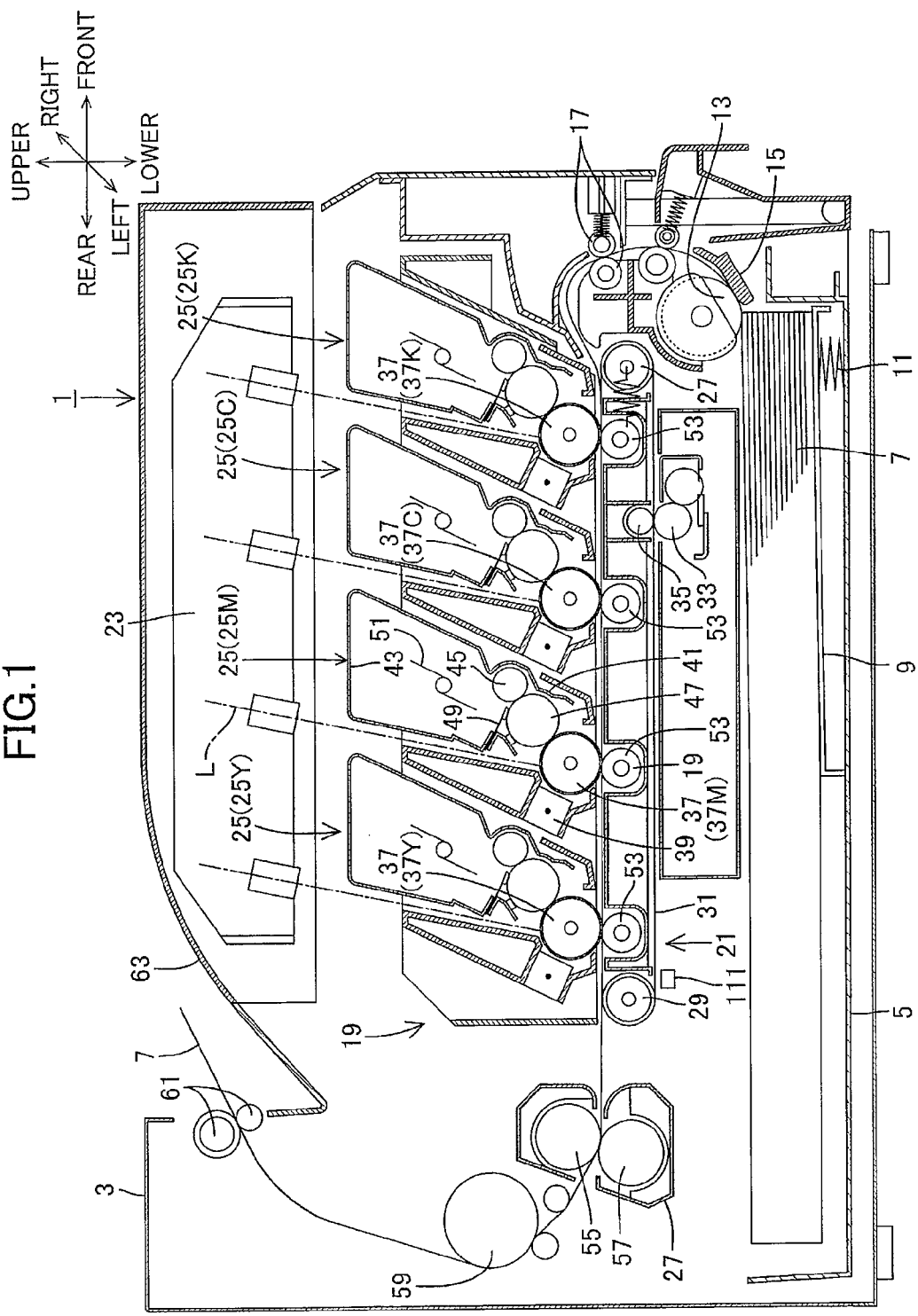
FIG. 1 is a cross-sectional view showing the overall structure of a printer according to a preferred embodiment of the present invention.

FIG. 1 is a side cross-sectional view showing the overall structure of a printer 1 according to the preferred embodiment. In the following description, the right side of the printer 1 (or right direction) in FIG. 1 will be referred to as the front side (or forward direction)

As shown in FIG. 1, the printer 1 is a direct transfer tandem-type color laser printer. The printer 1 includes a casing 3, and a paper tray 5 provided in the bottom of the casing 3 for holding a paper or other sheet-like recording medium 7 in a stacked state.

The printer 1 also includes a pressing plate 9 disposed in the paper tray 5 beneath the recording medium 7, a pickup roller 13 positioned above the front edge of the recording medium 7, a pair of registration rollers 17 disposed downstream of the pickup roller 13 with respect to a conveying direction, and a belt unit 21 disposed downstream of the registration rollers 17 in the conveying direction. The pressing plate 9 functions to press the recording medium 7 toward the pickup roller 13. The rotating pickup roller 13 picks up and conveys sheets of the recording medium 7 to the registration rollers 17. The registration rollers 17 correct skew in the sheets of recording medium 7 and convey the sheets onto the belt unit 21 at a prescribed timing.

The belt unit 21 includes a pair of support rollers 27 and 29, and an endless belt 31 looped around the support rollers 27 and 29. The driving rotation of the support roller 29 on the rear side, for example, moves the endless belt 31 circularly in the clockwise direction of FIG. 1 so that a sheet of recording medium 7 placed on top of the endless belt 31 is conveyed rearward.

A cleaning roller 33 is disposed on the underside of the belt unit 21 for removing toner (including a registration pattern 121" or "marks 119" described later, paper dust, and the like deposited on the endless belt 31.

The printer 1 also includes an image-forming unit 19 disposed above the belt unit 21, a scanning unit 23, and a fixing unit 27. The image-forming unit 19 includes process units 25.

The scanning unit 23 is disposed above the image-forming unit 19 and includes a laser light-emitting element (not shown) controlled to turn on and off based on image data. The laser light-emitting elements are provided for each color and irradiate laser beams L that are scanned at a high speed over the surfaces of photosensitive drums 37 provided in the image-forming unit 19 for each color.

The image-forming unit 19 has four of the process units 25 corresponding to the colors black, cyan, magenta, and yellow. Each of the process units 25 has the same construction, excluding the color of toner and the like. In the following description, the letters K (black), C (cyan), M (magenta), and Y (yellow) are appended to part numbers when it is necessary to distinguish between each color, but are excluding when such distinction is unnecessary.

Each process unit 25 includes the photosensitive drum 37, a charger 39, and a developer cartridge 41.

Each developer cartridge 41 includes a toner-accommodating chamber 43, a supply roller 45, a developing roller 47, a thickness-regulating blade 49, and an agitator 51 disposed in the toner-accommodating chamber 43.

Toner is supplied onto the developing roller 47 by the rotation of the agitator 51 and supply roller 45. The toner carried on the surface of the developing roller 47 is regulated to a thin layer of uniform thickness by the thickness-regulating blade 49 as the toner passes between the thickness-regulating blade 49 and developing roller 47.

The charger 39 charges the surface of the photosensitive drum 37 with a uniform positive polarity. Subsequently, the scanning unit 23 irradiates a laser beam onto the surface of the photosensitive drum 37 to form an electrostatic latent image corresponding to a color image to be formed on the recording medium 7.

The toner carried on the developing roller 47 is subsequently supplied to the electrostatic latent image formed on the surface of the photosensitive drum 37. Accordingly, the electrostatic latent image on the photosensitive drum 37 is developed into a visible toner image for the corresponding color.

As a sheet of recording medium 7 conveyed on the endless belt 31 passes through a transfer position between the photosensitive drum 37 and a corresponding transfer roller 53, the toner image carried on the surface of the photosensitive drum 37 is transferred onto the recording medium 7 by a negative transfer bias applied to the transfer roller 53. In this way, toner images in each color are sequentially transferred onto the recording medium 7 as the recording medium 7 is conveyed to the fixing unit 27.

The fixing unit 27 includes a heating roller 55 and a pressure roller 57 for conveying the recording medium 7 while applying heat to the same. The heat applied to the recording medium 7 fixes the transferred toner images to the recording medium 7. After the images have been fixed in the fixing unit 27, the recording medium 7 is conveyed by a conveying roller 59 to discharge rollers 61. The discharge rollers 61 discharge the recording medium 7 onto a discharge tray 63 formed on top of the casing 3.

<Electrical Structure of the Printer>

Figure 2:
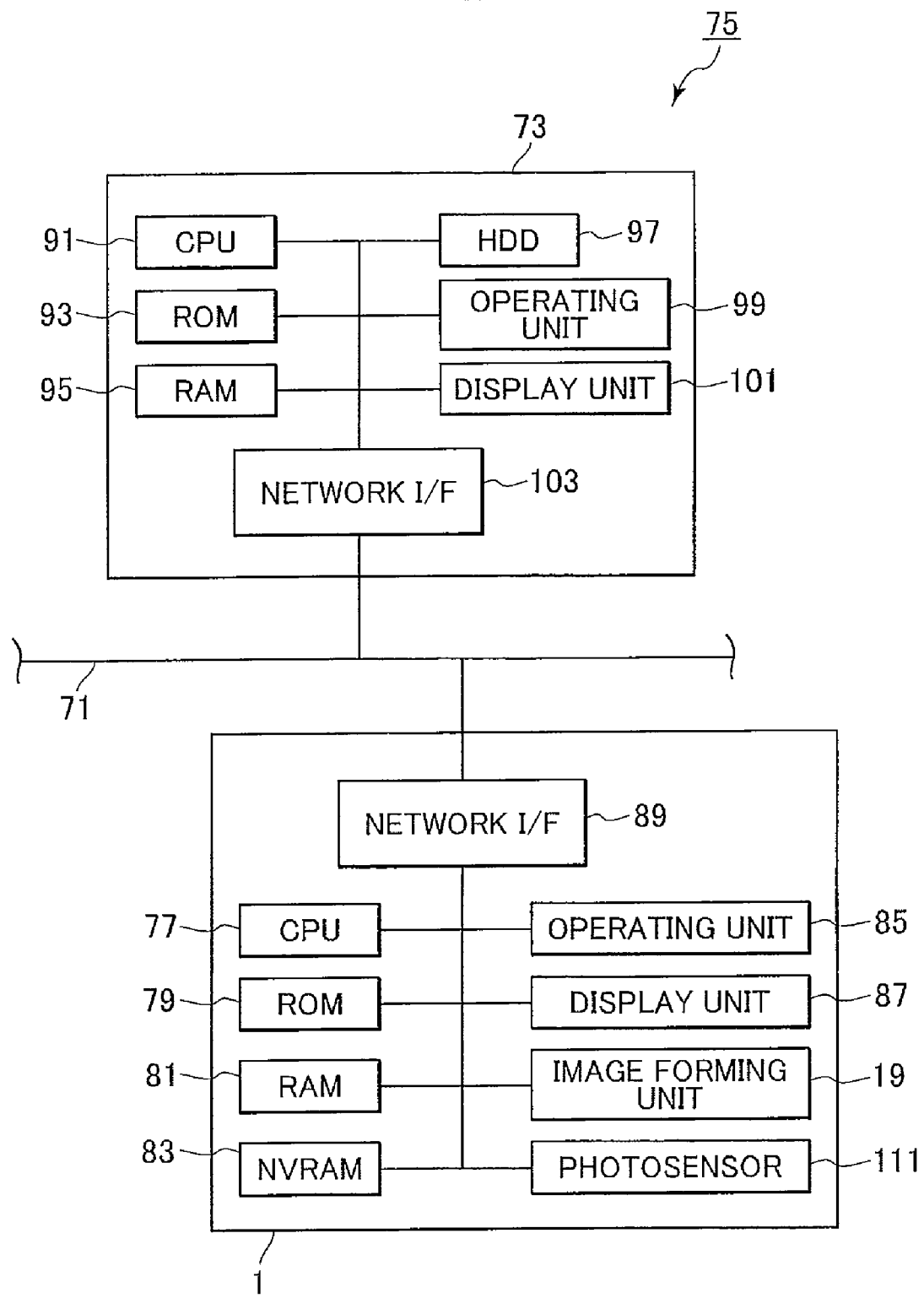
FIG. 2 is a block diagram showing the electrical structure of the printer.

FIG. 2 is a block diagram showing the electrical structure of the printer 1. The printer 1 includes a CPU 77, a ROM 79, a RAM 81, an NVRAM (nonvolatile memory) 83, an operating unit 85, a display unit 87, the image-forming unit 19 described above, a network interface 89, and photosensors 111.

The ROM 79 stores various programs for controlling operations of the printer 1. The CPU 77 controls operations of the printer 1 based on the programs read from the ROM 79 while storing processing results in the RAM 81 and NVRAM 83.

The operating unit 85 includes a plurality of buttons that the user can operate to input various instructions, such as a command to initiate printing. The display unit 87 is configured of a liquid crystal display and lamps for displaying various setup menus, operating states, and the like. The network interface 89 connects the printer 1 to an external computer (not shown) via a communication line 71, enabling data communications between the printer 1 and the external computer.

<Position Calibrating Process>

It is important to align the formation positions (transfer positions) of the color images in the tandem printer 1, because the color image will not be properly registered if the formation positions relative to the recording medium 7 deviate. Hence, a position calibrating process is performed to correct deviations in positions of the color images.

In the position calibrating process, the CPU 77 of the printer 1 reads data for a registration pattern 121A from the NVRAM 83, for example, and provides this data to the image-forming unit 19 as image data. The image-forming unit 19 forms the registration pattern 121A on the surface of the endless belt 31. The registration pattern 121A includes a plurality of marks 119 for each of the four colors, as will be described later, that are juxtaposed in the conveying direction of the endless belt 31 (front-to-rear direction of the printer 1).

IF the laser scanning positions are deviated from regular positions, the plurality of the marks 119 is not formed in positions ordered by the CPU 77. Therefore, the CPU 77 detects the positions of the marks 119 with the photosensors 111 described below, measures the amounts of deviation based on the detection results, and calibrates the laser scanning positions in order to cancel these deviations. Here, the laser scanning positions are positions in a subscanning direction in which the scanning unit 23 irradiates laser beams for each color onto the respective photosensitive drums 37. The laser scanning positions are modified by changing the timing at which the scanning unit 23 emits each laser beam.

1. Photosensors

Figure 3:
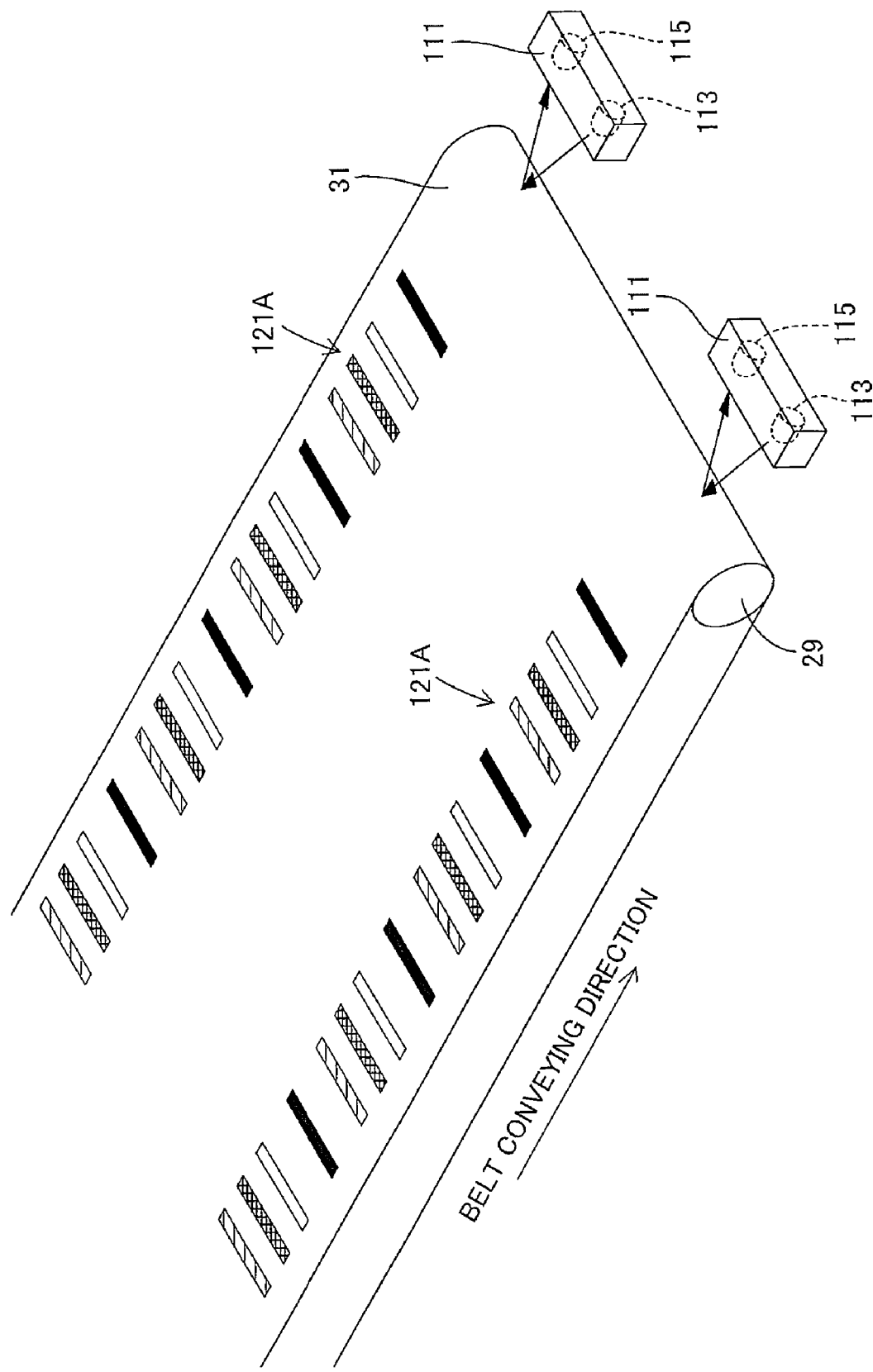
FIG. 3 is a perspective view of a photosensor and conveying belt.

As shown in FIG. 3, one or a plurality (two in the preferred embodiment) of the photosensors 111 is provided on the rear side of the endless belt 31 and juxtaposed in the left-to-right direction. Each of the photosensors 111 is a reflection sensor provided with a light-emitting element (such as an LED), and a light-receiving element (such as a phototransistor) 115. The light-emitting element 113 irradiates light obliquely onto the surface of the endless belt 31, and the light-receiving element 115 receives the light reflected off the surface of the endless belt 31. The regions in which the light emitted from the light-emitting elements 113 forms spots on the endless belt 31 are the detection regions of the photosensors 111.

Figure 4:
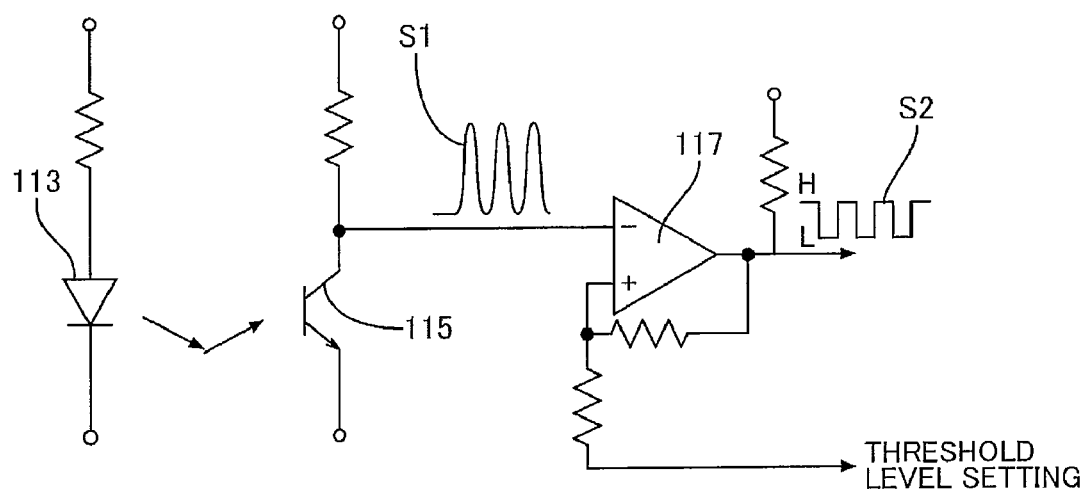
FIG. 4 is a circuit diagram of the photosensor.

FIG. 4 is a circuit diagram of the photosensor 111. The light-receiving element 115 outputs a light reception signal S1 at a lower level the higher the level of received light, and a higher level the lower the level of received light. The S1 is inputted into a hysteresis comparator 117. The hysteresis comparator 117 compares the level of the light reception signal S1 to a threshold value (first and second threshold values TH1 and TH2 described later) and outputs a binary signal S2 having a level inverted based on the results of comparison.

Figure 5:
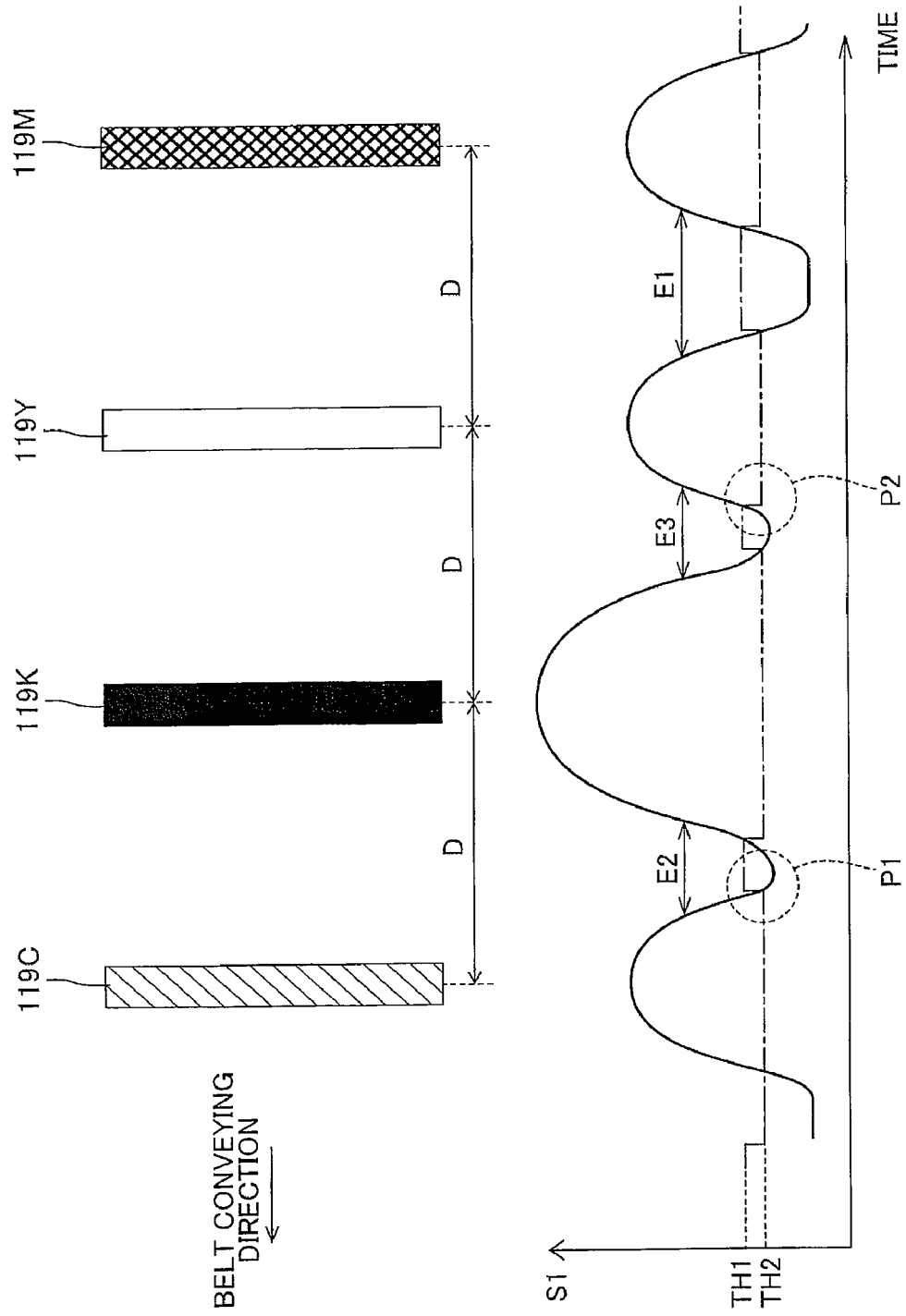
FIG. 5 is an explanatory diagram showing the relationship between color patterns and the waveforms of light reception signals.
Figure 7:
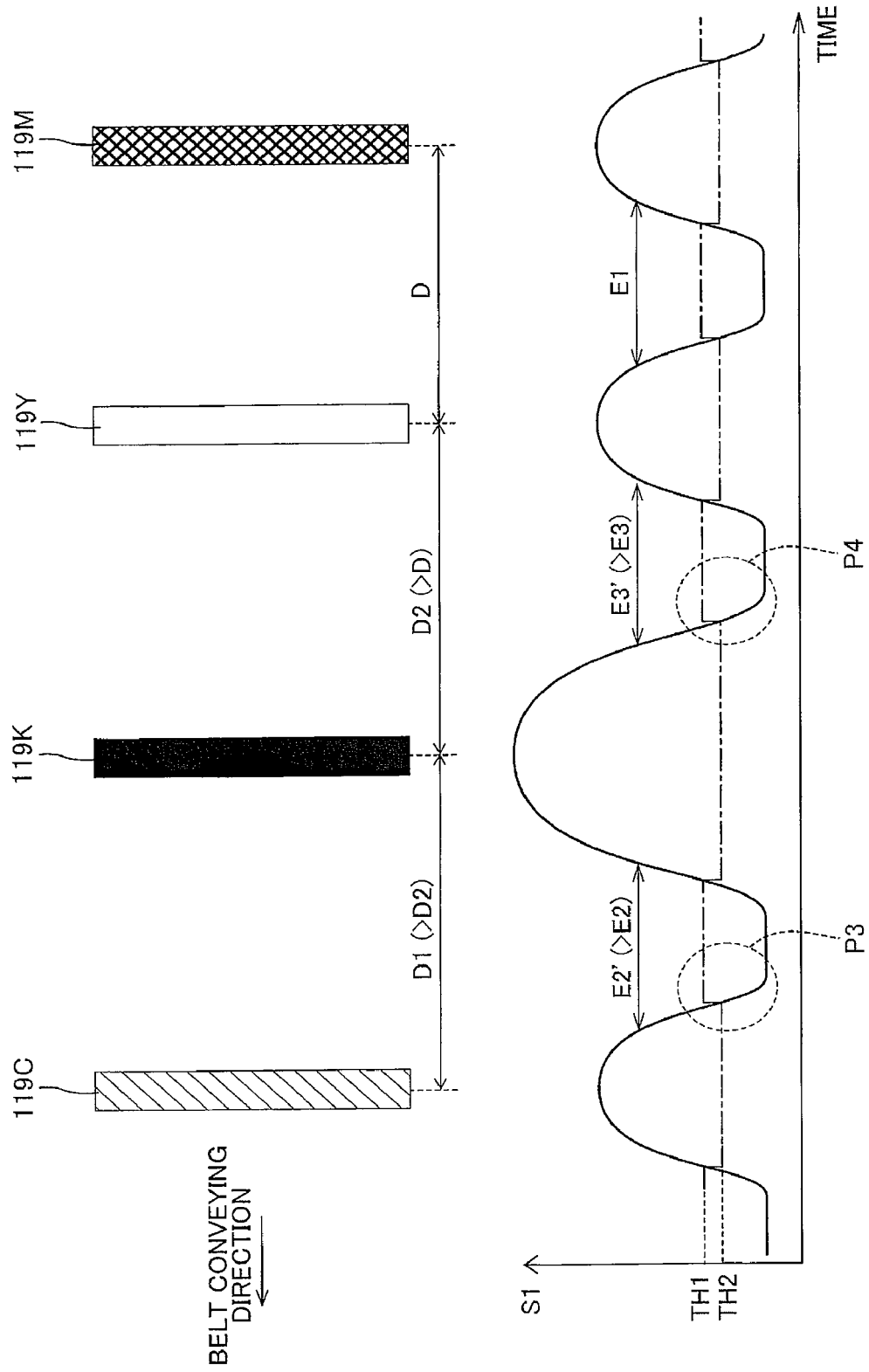
FIG. 7 is an explanatory diagram showing the relationship between color patterns and the waveforms of light reception signals.

2. Problems Associated with Differences in the Reflectance Characteristics of Achromatic and Chromatic Marks FIG. 5 shows the marks 119 of each color in the upper part of the drawing and the waveform of the light reception signal S1 when each mark 119 enters the detection region in the lower part of the drawing in the conventional technique. FIG. 7 shows the marks 119 of each color in the upper part of the drawing and the waveform of the light reception signal S1 when each mark 119 enters the detection region in the lower part of the drawing in the preferred embodiment. In FIGS. 5 and 7, the conveying direction of the endless belt 31 is toward the left.

The endless belt 31 in the preferred embodiment is formed of a material including polycarbonate, for example, and has a higher reflectance than toner of any of the four colors. Hence, the light reception signal S1 level is lowest when light irradiated from the light-emitting element 113 onto the background of the endless belt 31 (the surface of the endless belt 31 in which no mark is formed), as shown in FIGS. 5 and 7. On the other hand, when the light-emitting element 113 irradiates light onto the marks 119 formed on the endless belt 31, the light-receiving element 115 receives a lower level of light, resulting in a higher light reception signal S1 level.

Of the four colors used in the printer 1 of the preferred embodiment, cyan, magenta, and yellow are chromatic, while black is achromatic. Therefore, the reflectance of the black mark 119K is lower than the reflectances of the chromatic marks 119C, 119M, and 119Y. More specifically, the reflectance of the black mark 119K differs greatly from the reflectance of the endless belt 31, while the reflectances of the chromatic marks 119C, 119M, and 119Y differ slightly from the reflectance of the endless belt 31. A difference between the reflectance of the black mark 119K and any of the reflectances of the chromatic marks 119C, 119M, and 119Y is larger than a difference between the reflectances of any two of the chromatic marks 119C, 119M, and 119Y.

Therefore, under the condition that the marks are all the same shape and size, the waveform of the light reception signal S1 produced by reflected light from the black mark 119K (hereinafter simplified to "the light reception signal S1 for the black mark 119K") is broader along the time axis and has a higher peak than waveforms of the light reception signal S1 produced by the reflected light from the chromatic marks 119C, 119M, and 119Y (hereinafter simplified to "the light reception signal S1 for the chromatic marks 119C, 119M, and 119Y"), as shown in FIG. 5. Specifically, the light reception signal S1 for the black mark 119K depicts a waveform with a peak value and time width about 1.5 times those of the light reception signal S1 for the chromatic marks 119C, 119M, and 119Y.

FIG. 5 shows a conventional pattern in which the marks 119 of all colors are spaced at a uniform narrow distance D. It is assumed that the distance between the black mark 119K and the marks positioned just before and just after the black mark 119K (the cyan mark 119C and the yellow mark 119Y in FIG. 5) is narrow, and the black mark 119K and the chromatic marks 119C, 119M, and 119Y are detected using common photosensors 111. In such a case, distances E2 and E3 between waveforms of the light reception signal S1 for the black mark 119K and the marks directly before and after the black mark 119K (the cyan mark 119C and yellow mark 119Y) are narrower than a distance E1 between waveforms of the light reception signal S1 for the yellow mark 119Y and magenta mark 119M, as shown in FIG. 5. As a result, the waveforms of the light reception signal S1 can interfere with each other, making it impossible to detect each mark with accuracy (see P1 and P2 in FIG. 5).

Further, while the rising edge of the light reception signal S1 waveform for each of the marks 119 is compared with a high-level threshold TH1, the falling edge is compared with a low-level threshold TH2. Hence, if the waveform of received light from the black mark 119K interferes with the falling edge, such as, of the cyan mark 119C (see P1 in FIG. 5), the position at which the level of the light reception signal S1 passes through the threshold (specially, the second threshold TH2 since the second threshold TH2 is lower than the first threshold TH1) is susceptible to variance (interference by the black mark 119K), making it more difficult to output an accurate binary signal S2 corresponding to the original mark position than on the rising edge (see P2 in FIG. 5). The CPU 77 calculates an intermediate position (intermediate timing) between the rising and falling edges of the binary signal S2, for example, and sets this intermediate position as the position of the mark 119.

3. Registration Patterns in the Preferred Embodiment

Figure 6:
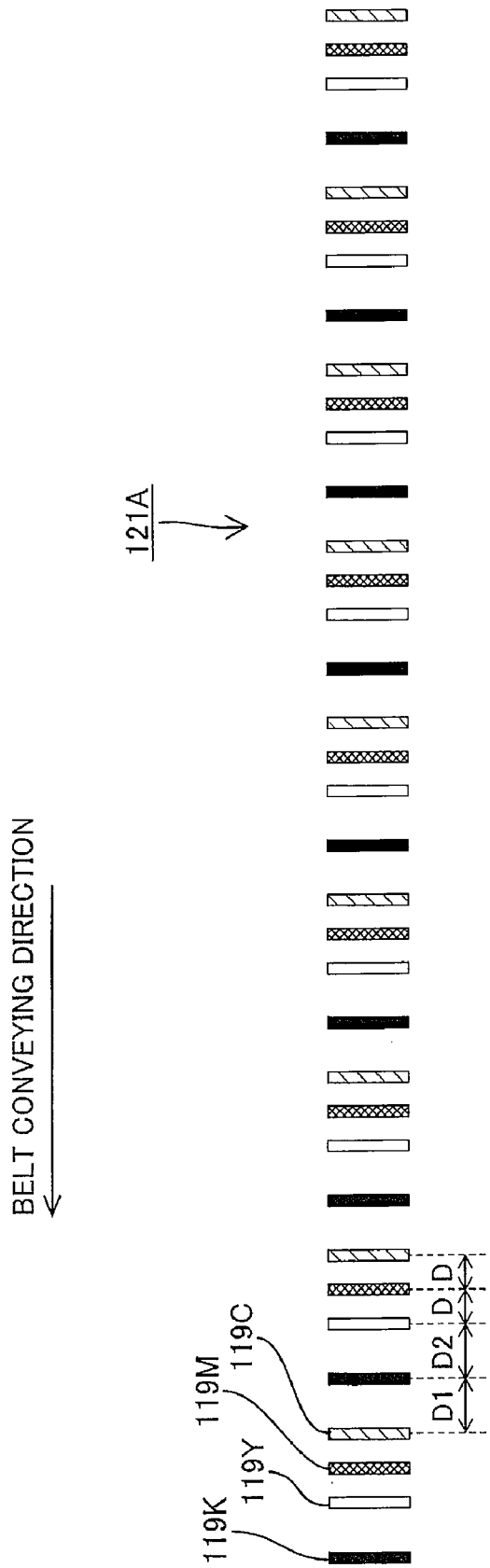
FIG. 6 is an explanatory diagram showing a registration pattern used for detecting deviation in the subscanning direction.

FIG. 6 shows the overall registration pattern 121A of the preferred embodiment. The registration pattern 121A is used to detect the amount of deviation in color registration in the subscanning direction (the conveying direction of the endless belt 31). Specifically, the registration pattern 121A includes a plurality of bar-shaped marks 119 extending in the left-to-right direction and juxtaposed along the conveying direction of the endless belt 31. One or a plurality (nine in the preferred embodiment) of sets of marks, each set including the black mark 119K, the yellow mark 119Y, the magenta mark 119M, and the cyan mark 119C in the order given, is arranged along the conveying direction of the endless belt 31. All of the marks 119 have the same width in the subscanning direction, while the distances (D1, D2, and D) between adjacent marks 119 are not necessarily same.

The CPU 77 detects positional offset of the chromatic marks 119C, 119M, and 119Y relative to the black mark 119K in each set of marks based on the binary signal S2 outputted from the photosensors 111. The CPU 77 calculates an average positional offset for each of the chromatic marks 119C, 119M, and 119Y in all sets of marks. The average offset for marks in each color is set as the amount of positional deviation in the subscanning direction for each color image relative to the black image. Next, the CPU 77 calibrates color registration in the subscanning direction by adjusting the timing at which the scanning unit 23 emits laser beams for each color. Specifically, the timing is adjusted so that distances between neighboring waveforms of the light reception signal S1 for the black mark 119K and the respective preceding and succeeding marks (cyan mark 119C and yellow mark 119Y) is substantially the same as a distance between neighboring waveforms of the light reception signal S1 for the yellow mark 119Y and magenta mark 119M as shown in FIG. 7.

As shown in FIG. 7, when the timing is adjusted as described above, the registration pattern 121A is formed so that a distance D1 (preceding first distance D1>D) between the black mark 119K and the mark positioned just before the black mark 119K in the conveying direction of the endless belt 31 (the cyan mark 119C in FIGS. 6 and 7) is greater than the maximum distance between any two chromatic marks (the yellow mark 119Y and magenta mark 119M, and the magenta mark 119M and cyan mark 119C in FIGS. 6 and 7; a second distance D). Further, the registration pattern 121A is formed so that a distance D2 (succeeding first distance D2>D) between the black mark 119K and the mark positioned directly after the black mark 119K in the conveying direction of the endless belt 31 (the yellow mark 119Y in FIGS. 6 and 7) is greater than the maximum distance among the second distances D.

When the registration pattern 121A is formed as described above, distances E2' and E3' between neighboring waveforms of the light reception signal S1 for the black mark 119K and the respective preceding and succeeding marks (cyan mark 119C and yellow mark 119Y) becomes substantially the same as a distance E1 between neighboring waveforms of the light reception signal S1 for the yellow mark 119Y and magenta mark 119M. In other words, the distances E2' and E3' become broader than the distances E2 and E3 in FIG. 5. Thus, the waveform of the light reception signal S1 for the black mark 119K is prevented from interfering with the waveform of the light reception signal S1 for the preceding or succeeding marks cyan mark 119C and yellow mark 119Y. Therefore, the positions of the marks 119 can be detected accurately (see P3 and P4 in FIG. 7).

On the other hands, the registration pattern 121A is formed so that the second distance D between any adjacent chromatic marks is less than the distances D1 and D2. The waveforms of the light reception signal S1 for the adjacent chromatic marks interfere with each other less than the waveform of the light reception signal S1 for the black mark 119K. Therefore, the second distance D between any adjacent chromatic marks is less than the distances D1 and D2. Therefore, the overall registration pattern 121A is prevented from becoming too long. Thus, the registration pattern 121A is formed so that the distances E2' and E3' become substantially the same as the distance E1.

The position at which the level of the light reception signal S1 passes through the second threshold TH2 is susceptible to interference by the black mark 119K, since the second threshold TH2 is lower than the first threshold TH1. However, since the preceding first distance D1 is set greater than the succeeding first distance D2 in the preferred embodiment, this configuration reliably prevents the CPU 77 from inverting the binary signal S2 at an incorrect timing due to the falling edge of the light reception signal S1 waveform for the cyan mark 119C (P3 in FIG. 7) interfering with the light reception signal S1 waveform for the black mark 119K.

Figure 8:
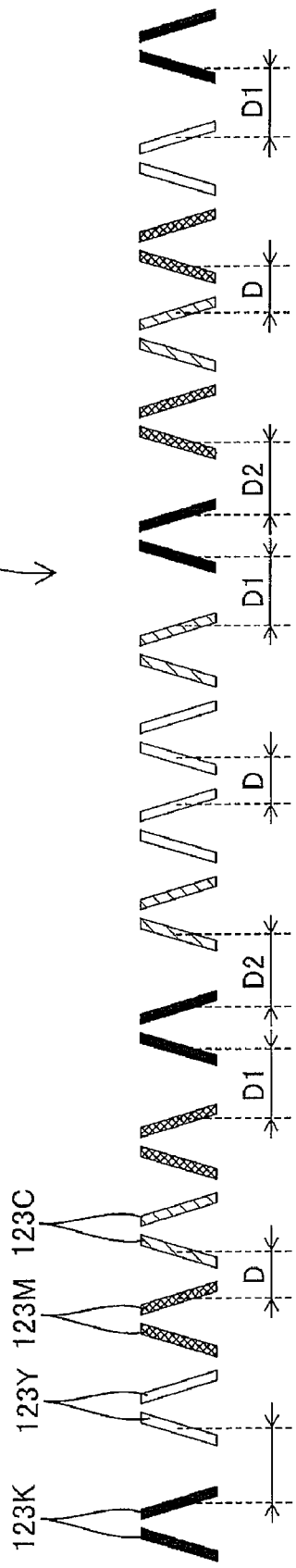
FIG. 8 is an explanatory diagram showing a registration pattern used for detecting deviation in the main scanning direction.

In the preferred embodiment, a registration pattern 121B is formed on the endless belt 31 besides the registration pattern 121A. FIG. 8 shows an overall registration pattern 121B according to the preferred embodiment. The registration pattern 121B is used for detecting amounts of deviation in color registration in the main scanning direction (direction orthogonal to the conveying direction of the endless belt 31). Specifically, the registration pattern 121B is configured of a plurality of pairs of marks 123 juxtaposed in the conveying direction of the endless belt 31. Each pair of marks 123 includes bar-shaped marks forming different angles to the main scanning direction. In the preferred embodiment, the marks 123 include four pairs each of black marks 123K, yellow marks 123Y, magenta marks 123M, and cyan marks 123C. All marks are bar-shaped and have the same width in the subscanning direction.

The CPU 77 detects the distance between both bar-shaped marks in each pair of marks based on the binary signal S2 outputted from the photosensors 111. Next, the CPU 77 calculates an average value of distances between the bar-shaped marks for the black marks 123K, yellow marks 123Y, magenta marks 123M, and cyan marks 123C, and sets the average value for each mark color as the amount of positional deviation in the main scanning direction. The CPU 77 calibrates color registration in the main scanning direction by adjusting the timing in which the scanning unit 23 emits laser beams for each color.

The distance D1 (preceding first distance>D) between the black mark 123K and the mark positioned directly before the black mark 123K in the conveying direction of the endless belt 31 (the magenta mark 123M, cyan mark 123C, and yellow mark 123Y) is greater than a second distance D between neighboring chromatic marks (the yellow mark 123Y and magenta mark 123M and the magenta mark 123M and cyan mark 123C in FIG. 8). A distance D2 (succeeding first distance>D) between the black mark 123K and the mark positioned directly after the black mark 123K in the conveying direction of the endless belt 31 (the magenta mark 123M, cyan mark 123C, and yellow mark 123Y in FIG. 8) is greater than the second distance D between neighboring chromatic marks. Moreover, the preceding first distance D1 is greater than the succeeding first distance D2.

4. First Distance Setting Process

Figure 9:
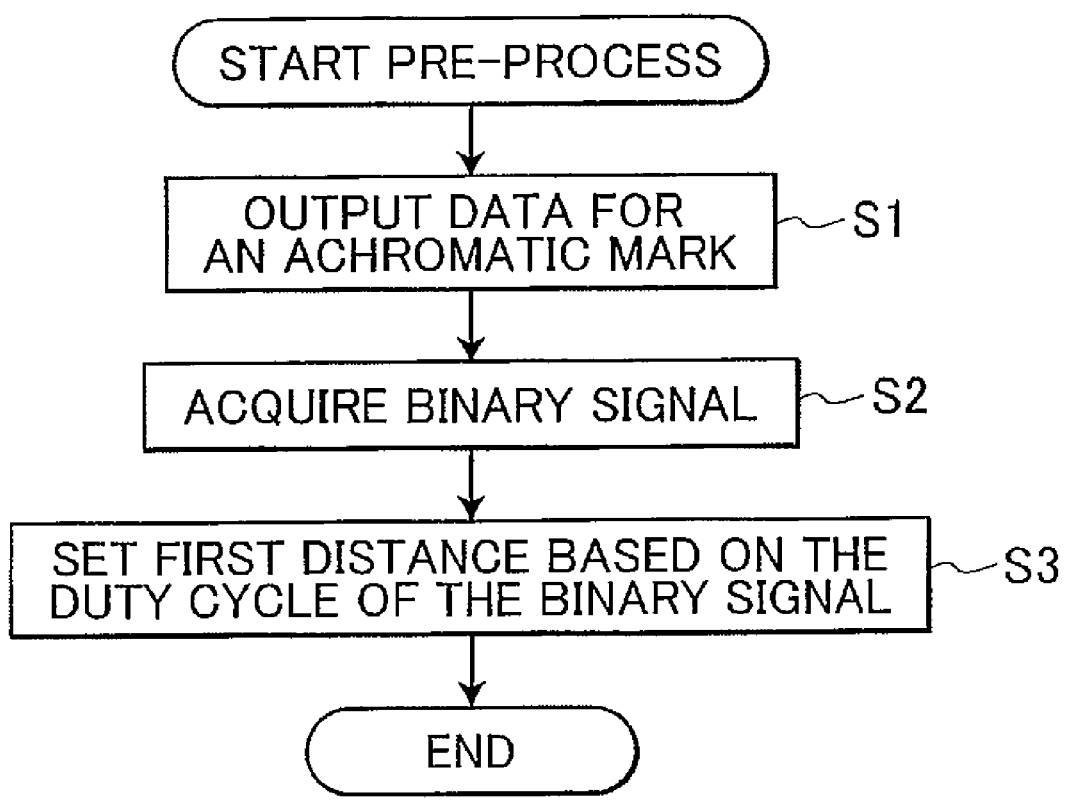
FIG. 9 is a flowchart illustrating steps in a pre-process.

The CPU 77 may be configured to automatically execute a pre-process shown in FIG. 9 prior to performing color registration calibration when the timing for executing the color registration calibration process has arrived, for example. The color registration calibration process is executed, when, for example, a predetermined number of recording medium has been recorded, a predetermined time period has elapsed, and a user ordered to execute the color registration calibration.

In S1 of this pre-process, the CPU 77 provides data for the black mark 119K (or the black mark 123K) to the image-forming unit 19 to form the black mark 119K on the endless belt 31. In S2 the CPU 77 acquires the binary signal S2 from the photosensors 111. In S3 the CPU 77 sets the preceding first distance D1 and succeeding first distance D2 to values corresponding to a low-level time (pulse width) of the binary signal S2. For example, if the low-level time is greater than the previous time required for executing the pre-process, the CPU 77 can set the preceding first distance D1 and succeeding first distance D2 to larger values.

The light reception signal S1 waveform for the black mark 119K or black mark 123K can vary according to changes in the printer 1 environment. Hence, it is preferable to modify the preceding first distance D1 and succeeding first distance D2 appropriately based on the environment through this pre-process.

<Effects of the Invention>

In the preferred embodiment, the reflectance of the endless belt 31 is greater than that of the black mark and the chromatic marks. The registration pattern 121 is configured so that first distances D1 and D2 between the black mark and the marks positioned directly before and directly after the black mark are greater than a second distance D between neighboring chromatic marks. This configuration reduces interference between the reception light waveforms for black and chromatic marks and, moreover, reduces the overall length of the pattern compared to a pattern having a uniform distance greater than the first distances D1 and D2 between all marks.

Further, the black mark 119K is positioned in the front in the registration pattern 121A and the black mark 123K is positioned in both the front and back in the registration pattern 121B, thereby reducing the overall length of the registration pattern compared to a pattern that arranges the black mark 119K or black mark 123K between all of the other marks rather than at the beginning and ending of the row. Reducing the length of the registration pattern reduces the time required for detection with the photosensors 111, thereby speeding up the position calibrating process.

Further, setting the distance between chromatic marks that have little influence on each other to a uniform distance simplifies the registration pattern 121 and simplifies the process for detecting positions of the marks 119 and marks 123.

It is conceivable to modify the distance between marks by modifying the widths of the marks 119 and marks 123 in the subscanning direction. However, setting the widths of all marks as in the preferred embodiment simplifies the pattern and simplifies the process for detecting positions of the marks.

<Variations of the Embodiment>

While the invention has been described in detail with reference to specific embodiments thereof, it would be apparent to those skilled in the art that many modifications and variations may be made therein without departing from the spirit of the invention, the scope of which is defined by the attached claims.

(1) While the preceding first distance and succeeding first distance are both set greater than the second distance in the preferred embodiment described above, it is possible to set only one of the preceding first distance and succeeding first distance greater than the second distance. However, the configuration of the preferred embodiment more reliably reduces interference between light reception waveforms for the first mark.

(2) While the reflectance of the endless belt 31 is set greater than that of the achromatic (black) mark and the chromatic marks, by setting the reflectance of the endless belt 31 smaller than that of the achromatic and chromatic marks, the light reception waveform of the light-receiving element for chromatic marks would be broader along the time axis than the light reception waveform of the light-receiving element for the achromatic mark. In this case, the registration pattern should be configured so that the distance between a chromatic mark and a preceding or succeeding chromatic mark is greater than the distance between adjacent achromatic marks.

(3) In the preferred embodiment, the preceding first distance D1 is set longer than the succeeding first distance D2 with consideration for the effects of hysteresis in the hysteresis comparator 117. However, there may be cases in which it is desirable to set the succeeding first distance D2 greater than the preceding first distance D1 according to the circuit structure of the hysteresis comparator 117.

(4) In the preferred embodiment described above, the CPU 77 performs calibration by adjusting the timing at which laser beams are emitted based on detected deviations in color registration. However, the CPU 77 may be configured to notify the user on the display unit 87 of the printer 1, for example, that the detected value exceeds the prescribed value, without performing calibration.

(5) In the preferred embodiment described above, the "target" on which patterns are formed is the endless belt 31 used for conveying the recording medium, but the target may be the recording medium 7 conveyed by the endless belt 31, such as a sheet of paper or transparency. Further, when the image-forming device employs an intermediate transfer system, the target may be the intermediate transfer belt functioning to directly carry developed images transferred from the image-carrying member.

(6) While the image-forming device in the preferred embodiment is a direct transfer-type color laser printer, the present invention may be applied to a laser printer with an intermediate transfer system or an inkjet printer. Further, the printer may employ two, three, or five or more colors.

(7) In the preferred embodiment described above, the distance D1 between the black mark 119K and marks positioned directly before and directly after the black mark 119K in the conveying direction of the endless belt 31 is set greater than the maximum distance of the second distance D between adjacent chromatic marks. However, a pattern having the first distance D1 set at least greater than the minimum distance among the second distances D2 can suppress interference between reception light waveforms better than a pattern having the same interval between all marks. However, the configuration described in the preferred embodiment can reduce interference between reception light waveforms over the entire pattern.

What is claimed is:

1. An image-forming device comprising:
   a conveying unit configured to convey a target in a conveying direction, the target having a target light reflectance;
   a pattern data generating unit configured to generate pattern data indicating a pattern in which a plurality of marks is arranged in the conveying direction, the plurality of marks including a first mark having a first color and a first light reflectance and a plurality of second marks having a plurality of second colors and a plurality of second light reflectance, the plurality of second colors being equal to or different from one another, the plurality of second light reflectance being equal to or different from one another, a first difference between the target light reflectance and the first light reflectance being greater than a second difference between the target light reflectance and any of the plurality of second light reflectance, a difference between the first light reflectance and any of the second light reflectance being larger than a difference between any two of the second light reflectance, at least one of first distances between the first mark and the marks adjacent to the first mark being greater than a minimum distance between the adjacent second marks;

an image-forming unit configured to form the plurality of marks in the conveying direction at positions on the target based on the pattern data; and a detecting unit configured to detect the positions at which the plurality of marks is formed on the target, based on changes of light reflected from the target and the plurality of marks in the conveying direction.

2. The image-forming device according to claim 1, wherein at least one of the first distances is greater than a maximum distance between the adjacent second marks.

3. The image-forming device according to claim 1, wherein the target reflectance is greater than the first reference and the second reference.

4. The image-forming device according to claim 3, wherein the first color is an achromatic, and the plurality of second colors is chromatic.

5. The image-forming device according to claim 1, wherein both of the first distances are greater than the minimum distance.

6. The image-forming device according to claim 5, wherein the detecting unit includes:

a light-receiving element configured to receive the light reflected from the target and the plurality of marks; and a hysteresis comparator having a hysteresis and configured to compare an amount of the light received by the light-receiving element with a threshold value to output a binary signal indicating an existence of each mark, wherein the first distance has a preceding first distance between the first mark and a mark adjacent to and preceding the first mark, and a following first distance between the first mark and a mark adjacent to and following the first mark, the preceding first distance being greater than the following first distance.

7. The image-forming device according to claim 1, wherein the pattern has a leading position and a trailing position in the conveying direction, the first mark being arranged in at least one of the leading position and the trailing position.

8. The image-forming device according to claim 1, further comprising a calibrating unit configured to calibrate positions in which the image-forming unit forms images, based on the positions of the plurality of marks detected by the detecting unit.

9. The image-forming device according to claim 1, further comprising a modifying unit configured to modify at least one of the first distances based on changes of light reflected from the first mark.

10. The image-forming device according to claim 1, wherein the plurality of second marks includes at least two sets of adjacent second marks, and second distances between the second marks in the sets are equal to one another.

11. The image-forming device according to claim 1, wherein the plurality of marks has same width in the conveying direction equal to one another.

* * * * *